United States Patent
Chou et al.

(10) Patent No.: US 11,836,023 B2
(45) Date of Patent: Dec. 5, 2023

(54) AUTOMATIC DETECTION OF COOLING SYSTEM BASED ON A TACHOMETER SIGNAL

(71) Applicant: Dell Products L.P., Round Rock, TX (US)

(72) Inventors: Pei-Yi Chou, Taipei (TW); Chien-Yi Juan, New Taipei (TW); Che-Ling Huang, New Taipei (TW); Adolfo Montero, Pflugerville, TX (US); William Leara, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/689,636

(22) Filed: Mar. 8, 2022

(65) Prior Publication Data

US 2023/0288970 A1     Sep. 14, 2023

(51) Int. Cl.
*G06F 1/20* (2006.01)
*G05B 15/02* (2006.01)

(52) U.S. Cl.
CPC .............. *G06F 1/206* (2013.01); *G05B 15/02* (2013.01); *G06F 2200/201* (2013.01)

(58) Field of Classification Search
CPC ..................................................... G06F 1/206
See application file for complete search history.

(56) References Cited

U.S. PATENT DOCUMENTS

| | | | |
|---|---|---|---|
| 2009/0277617 A1* | 11/2009 | Hood, III | G06F 1/20 165/104.34 |
| 2016/0330865 A1* | 11/2016 | Mathew | H05K 7/20781 |
| 2018/0217646 A1* | 8/2018 | Mikkelsen | G06F 1/206 |
| 2019/0390864 A1* | 12/2019 | Lambert | F24F 11/52 |
| 2020/0042052 A1* | 2/2020 | Shabbir | H05K 7/20809 |
| 2020/0088793 A1* | 3/2020 | Montero | G06F 1/20 |
| 2021/0365087 A1* | 11/2021 | Chen | G06F 1/206 |

* cited by examiner

*Primary Examiner* — Suresh Suryawanshi
(74) *Attorney, Agent, or Firm* — ZAGORIN CAVE LLP; Mark Zagorin (57) ABSTRACT

An information handling system uses one connector for both liquid and air cooling and detects the type of cooling system installed. That provides the ability to choose the correct thermal handling table based on the installed cooling system. To detect the type of cooling system installed, a thermal management controller sets a control signal supplied to the cooling system through the connector to a first control value and determines if a tachometer signal supplied by the cooling system to the thermal management controller through the connector indicates a first type of cooling system. If the first type of cooling system is not detected, the thermal management controller checks if the tachometer signal from the cooling system with the control signal set at the first control value, or alternatively at a second control value, indicates a second type of cooling system. If no cooling system is detected, an error condition exists.

20 Claims, 9 Drawing Sheets

| LIQUID COOLING | | AIR COOLING | |
|---|---|---|---|
| Pin1 | GROUND | Pin1 | GROUND |
| Pin2 | POWER | Pin2 | POWER |
| Pin3 | TACH SIGNAL OUTPUT | Pin3 | TACH |
| Pin4 | PRESENCE (JUMP TO GROUND) | Pin4 | PWM |

AUTOMATIC DETECTION OF COOLING SYSTEM BASED ON A TACHOMETER SIGNAL

BACKGROUND

Field of the Invention

This invention relates to detection of the type of cooling system being used in an information handling system.

Description of the Related Art

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
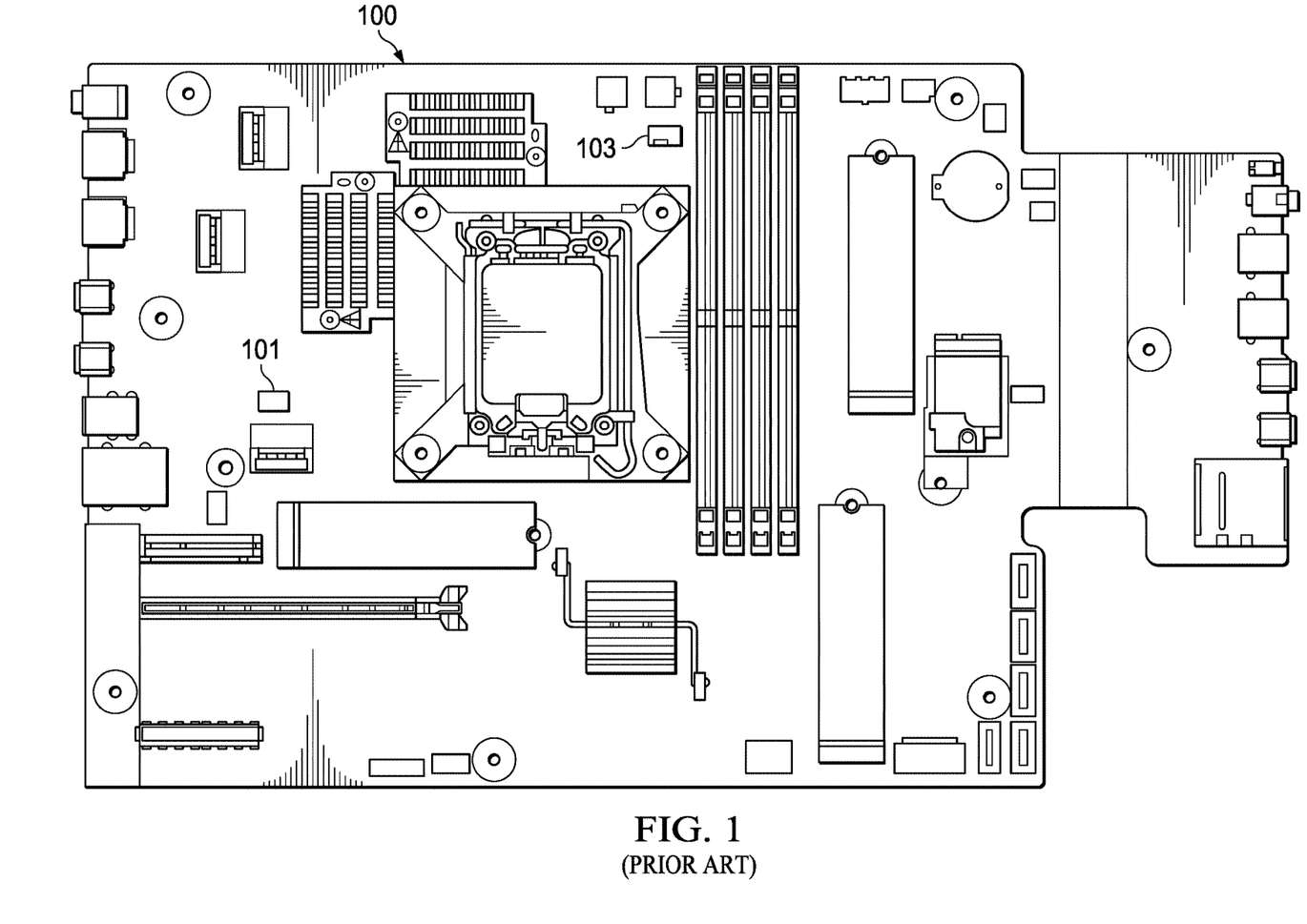
FIG. 1 illustrates a prior art motherboard with separate connectors for a liquid cooling system and an air cooling system.
Figure 2A:
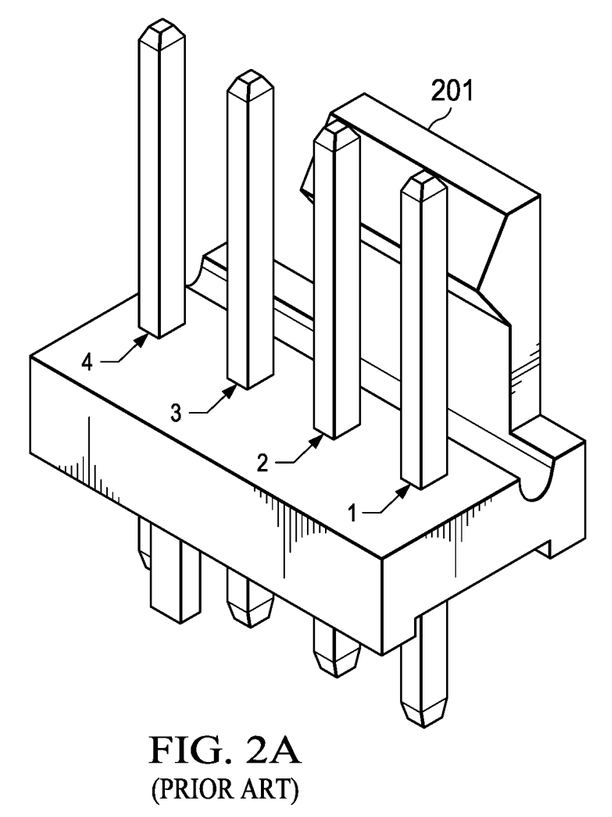
FIG. 2A illustrates a prior art four pin connector used for the connectors shown in FIG. 1.
Figure 2B:
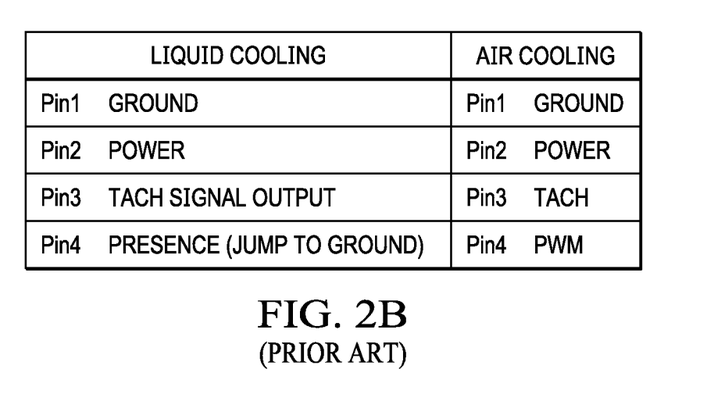
FIG. 2B is a table illustrating pin outs for the connectors shown in FIG. 1.

Current desktop designs that support both liquid and air cooling to cool the processors use a separate connector for each cooling type of cooling system. As shown in FIG. 1 motherboard 100 includes a connector 101 that supports control of a liquid cooling system and connector 103 that supports control of an air cooling system. FIG. 2A illustrates an example connector 201 that may be used for connectors 101 and 103. The connector is a four pin connector KK type connector available, e.g., from Molex. To support air cooling using a fan, as shown in the table in FIG. 2B, pin 1 of the connector 103 is connected to ground, pin 2 to power, pin 3 is the tachometer pin from the fan motor, and pin 4 is the pulse width modulated (PWM) control signal supplied to the fan motor. For using the connector for a liquid cooling system, in one prior art system, pin 1 of the connector is connected to ground, pin 2 is connected to power, pin 3 is connected to the tachometer signal, and pin 4 is connected to ground.

A well-designed cable routing approach ensures that liquid/air cooling harnesses cannot be connected to the wrong connector preventing mix-ups as to air/liquid cooling installation in the production flows in the factory. However, users sometimes change the factory-installed liquid/air cooling system with a third party solution. That creates a possibility that end users might get the liquid/air cooling connectors mixed up, which would result in improper system operation due to installing the cooling system with the wrong connector. It would be desirable to prevent such mix ups and the resultant possibilities of improperly operating and even damaging systems.

SUMMARY OF EMBODIMENTS OF THE INVENTION

Accordingly, embodiments herein avoid the possibility of an improperly installed cooled system due to use of the wrong connector by automatically detecting the cooling system being used and using only a single connector for both cooling systems thereby reducing the cost.

In one embodiment a method for determining a cooling system being used in an information handling system includes setting a control signal for the cooling system to a first control value. The cooling system is determined to be a first type of cooling system responsive to a tachometer signal indicating a first tachometer value corresponding to the first type of cooling system. The cooling system is determined to be a second type of cooling system responsive to the tachometer signal indicating a second tachometer value corresponding to the second type of cooling system.

In another embodiment an information handling system includes a connector and a thermal management controller is coupled to receive a tachometer output from the connector. A cooling system is coupled to the connector and supplies the tachometer signal to the connector. The thermal management controller determines the cooling system to be a first type of cooling system responsive to the tachometer signal indicating a first tachometer value corresponding to the first type of cooling system and the thermal management controller determines the cooling system to be a second type of cooling system responsive to the tachometer signal indicating a second tachometer value corresponding to the second type of cooling system.

In another embodiment an information handling system includes a cooling system. A thermal management controller is coupled to receive a tachometer signal and supply a control signal to control the cooling system. A connector is coupled to receive the control signal from the thermal management controller and to supply the control signal to the cooling system and to receive the tachometer signal from the cooling system and to supply the tachometer signal to the thermal management controller. The thermal management controller determines the cooling system to be a first type of cooling system responsive to the tachometer signal indicating the first type of cooling system and determines the cooling system to be a second type of cooling system responsive to the tachometer signal indicating the second type of cooling system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
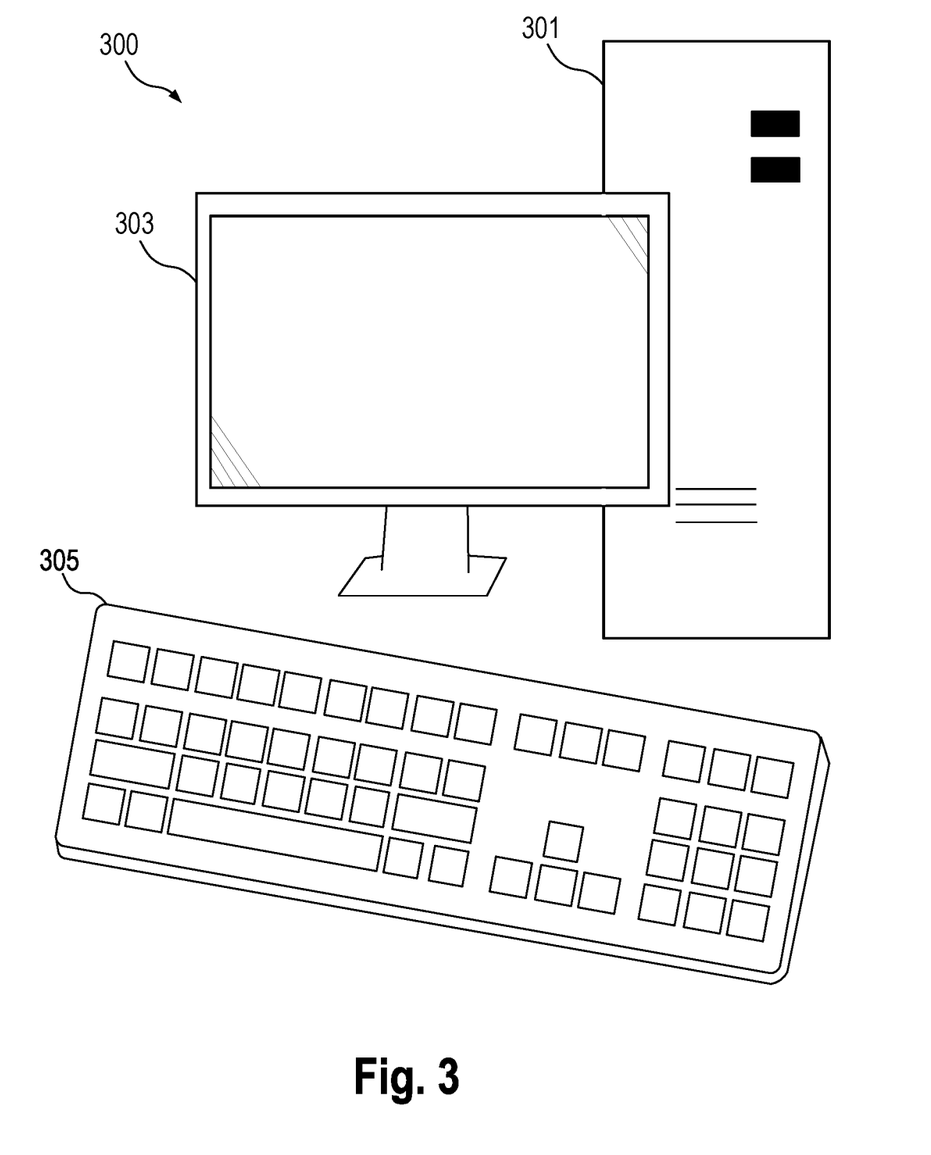
FIG. 3 illustrates an exemplary information handling system configured as a desktop system.

FIG. 3 illustrates an exemplary information handling system 100 in a desktop configuration that includes the desktop housing 301 containing the processors, memory, and related electronics, a monitor 303, and a keyboard 305. The cooling systems described herein can typically be used on a desktop system although other IHS configurations can also use either air or liquid cooling.

Figure 4:
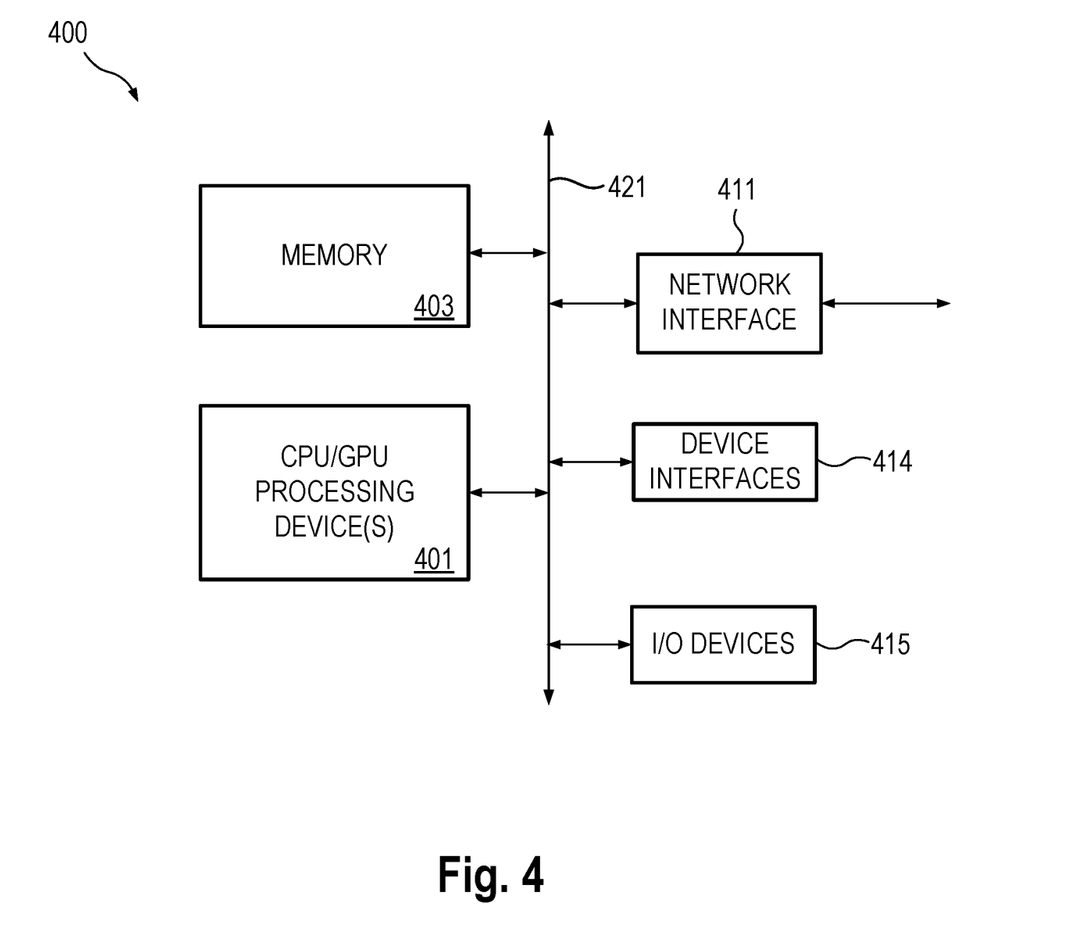
FIG. 4 illustrates a high-level block diagram of an information handling system.

FIG. 4 illustrates a high level block diagram of a portion of an information handling system (IHS) 400. The IHS 400 may be configured in a portable configuration, such as a tablet or convertible form factor, a stationary configuration, such as a desktop or tower form factor, a server configuration or other types of more specialized form factors, such as storage devices. The system 400 includes processing device(s) 401, the processing devices(s) including one or more central processing units (CPUs), and/or one or more graphics processing units (GPUs), each having one or more processing cores, for executing the various types of program instructions stored in memory 403 such as Basic Input/Output System (BIOS), the operating system, and various applications. The memory 403 may include volatile memory including random access memory and non-volatile memory such as read-only memory (ROM), flash memory, non-volatile random access memory (NVRAM), and one or more computer readable storage devices such as, e.g., a hard disk drive or solid-state drive. In embodiments, IHS 400 includes one or more network interface device(s) 411 enabling IHS 400 to communicate with other devices, systems and/or one services, more device interface(s) 414, and one or more I/O device(s) 415. Processing device(s) 401, system memory 403, network interface device(s) 411, device interface(s) 414, and I/O device(s) 415 are coupled to system interconnect 421 for communicating signals and data between the various system components. System interconnect 421 may represent one or more buses, interfaces, hubs and/or controllers that are used to transfer information between the various system components. Other components not specifically shown in FIG. 4 may also be included within the information handling system 400. System 400 may include additional processing devices such as embedded controllers (referred to herein as microcontrollers (MCUs), programmable logic devices (such as a field programmable gate array "FPGA", complex programmable logic device "CPLD", etc.) to support various I/O tasks. One such MCU provides thermal management control for the IHS.

Device interface(s) 414 may generally include one or more communication interfaces or ports, which provide physical connection to and enable communication with external devices and cables. Examples of device interface(s) 414 include, but are not limited to, a Universal Serial Bus (USB) interface, a card reader, a Personal Computer Memory Card International Association (PCMCIA) port, and a high-definition multimedia interface (HDMI). Input/Output (I/O) device(s) 415 may include any input device and/or output device provided on, within or coupled to an IHS. Examples of input devices include, but are not limited to, a keyboard, mouse, touch screen, touch pad, microphone, and a camera. Examples of output devices include, but are not limited to, a computer monitor, a display device, printer, or audio speaker(s).

Figure 5:
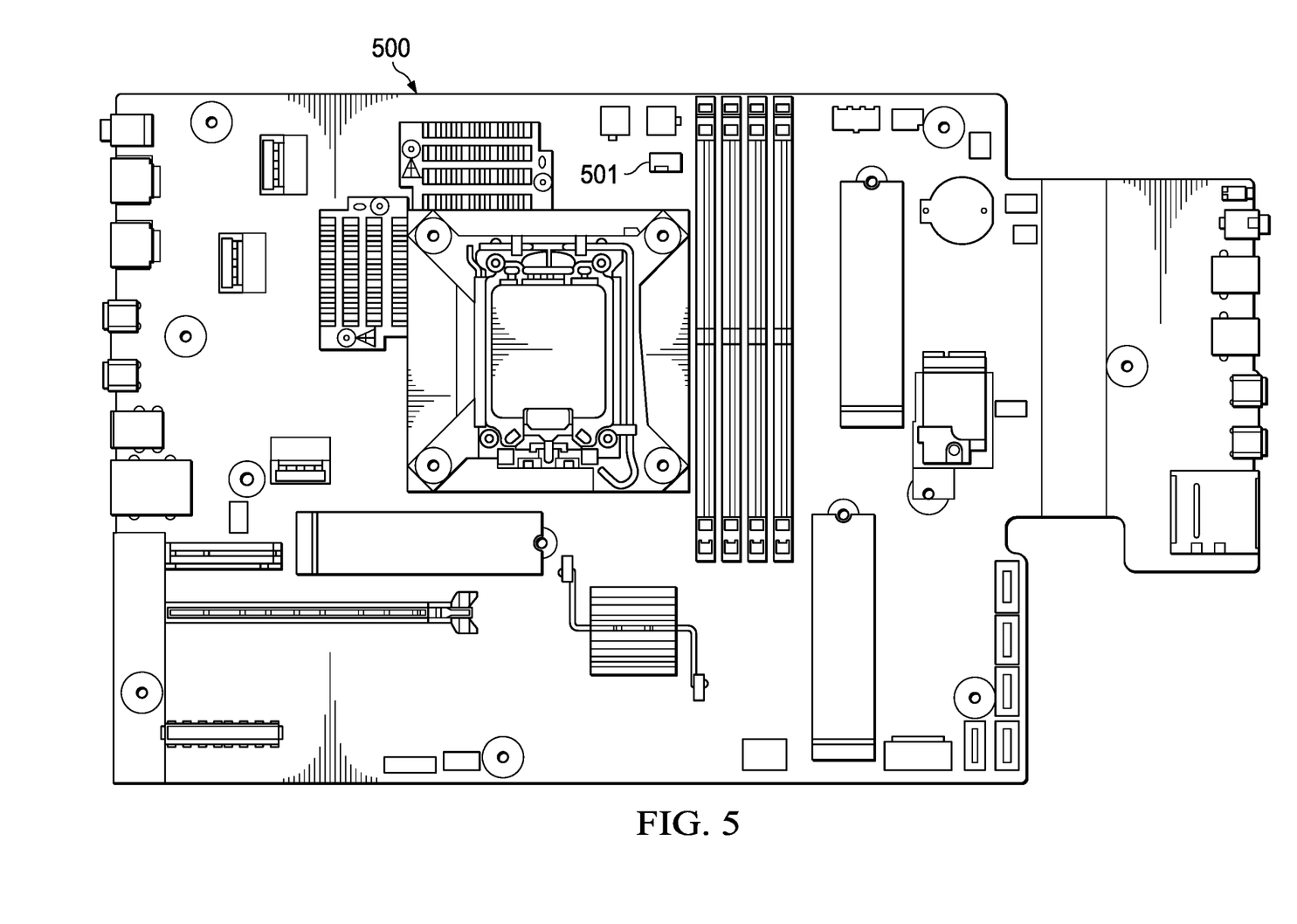
FIG. 5 illustrates a motherboard with a single connector for a liquid cooling system and an air cooling system according to an embodiment.

Embodiments described herein use a single connector to support installation of two cooling systems and automatically detect which of the two cooling systems are installed. In at least one embodiment the primary difference between the air-cooling system and the liquid-cooling system is that the liquid-cooling pump operates at a fixed output revolutions per minute (RPM) regardless of input pulse width modulation (PWM) signal. In contrast, for the air-cooling system, the RPM of the fan changes as the PWM input changes. Instead of using the two different connector pinouts illustrated in FIG. 2 for the two cooling systems, FIG. 5 shows an embodiment of a motherboard 500 of an IHS in which the two connectors 101 and 103 shown on motherboard 100 (FIG. 1) are combined into a single connector 501 used for both liquid cooling and air cooling and used for detection of the cooling system that is installed. The system keeps pin 4 of the connector 501 as a PWM signal for whatever cooling system is installed and uses the tachometer signal from the installed cooling system to detect the type of cooling system that is installed in the IHS.

Figure 6:
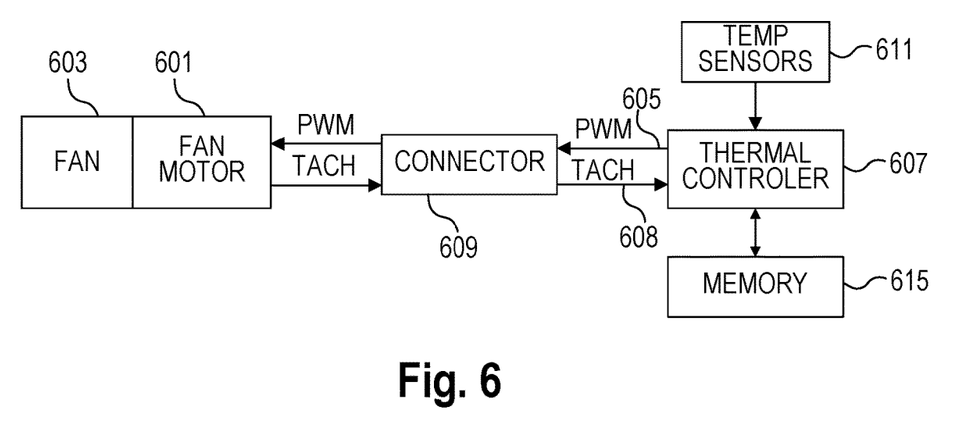
FIG. 6 illustrates a block diagram showing a thermal controller being used in an air cooling system.

FIG. 6 illustrates a high level block diagram of an air cooling system 600. The fan motor 601 controls the RPM of the fan 603 based on the PWM control signal 605 supplied from the thermal controller 607 through the connector 609. In one or more embodiments, the thermal controller 607 is a microcontroller unit (MCU). The fan motor 601 supplies the thermal controller 607 with a tachometer output signal 608 through the connector 609. In an embodiment the tachometer signal supplies pulses with each pulse representing a particular RPM value. For example, two pulses may be used to represent each revolution. The number of pulses received over a minute indicates the RPM of the fan. Other embodiments can use a different signaling protocol for RPM. Note that the ground and power connections (pins 1 and 2) of connector 609 are not shown in FIG. 6 for ease of illustration. In one or more embodiments the thermal controller 607 also receives temperature information from temperature sensors 611. The memory 615 stores programming code, e.g., firmware, for use by the thermal controller 607 to implement thermal management and also stores tables or other data for use in thermal management. The memory 615 or portions thereof may be part of the MCU integrated circuit or separate, may be volatile or non-volatile memory, or a combination, and may be distributed in separate locations on the motherboard accessible to the MCU according to the needs of a particular embodiment.

Figure 7:
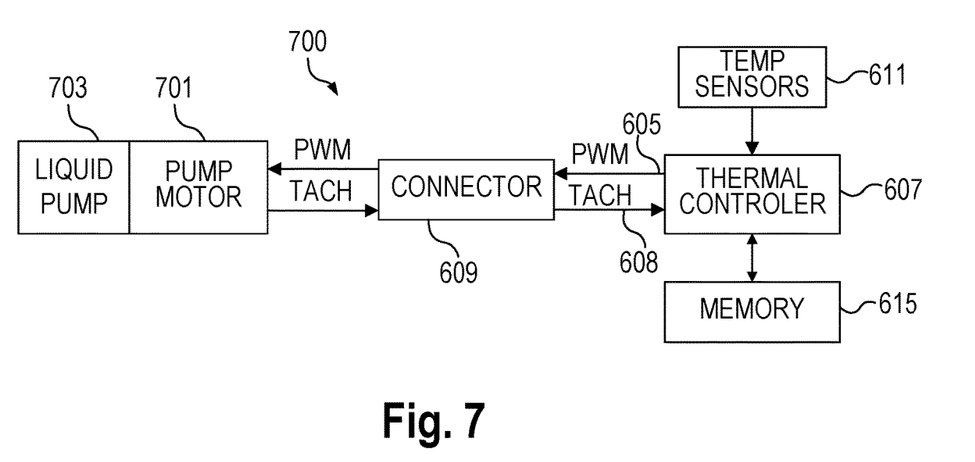
FIG. 7 illustrates a block diagram showing a thermal controller being used in a liquid cooling system.

FIG. 7 illustrates a high level block diagram of a liquid cooling system 700. The pump motor 701 controls the pump 703. For example, the pump motor controls the rotational speed of the impeller in the pump 703. The tachometer signal 608 supplied to the thermal controller 607 through the connector 609 represents the rotational speed of the impeller or the pump motor depending on the type of pump being used. The RPM is represented by pulses or some other RPM signaling protocol. In some embodiments of the liquid cooling system, the tachometer output is fixed regardless of the PWM input. The ground and power connections (pins 1 and 2) of connector 609 are not shown in FIG. 7.

Separate tables (and/or other thermal data) are used for the different cooling systems. For example, the thermal controller 607 may use one data set to determine the appropriate PWM signal based on detected temperatures for the air cooling system and a different data set to determine the PWM signal for liquid cooling. In addition, or in place of tables, the thermal controller 607 may use different formulas to scale the cooling output of the different cooling systems based on detected temperatures.

Figure 8:
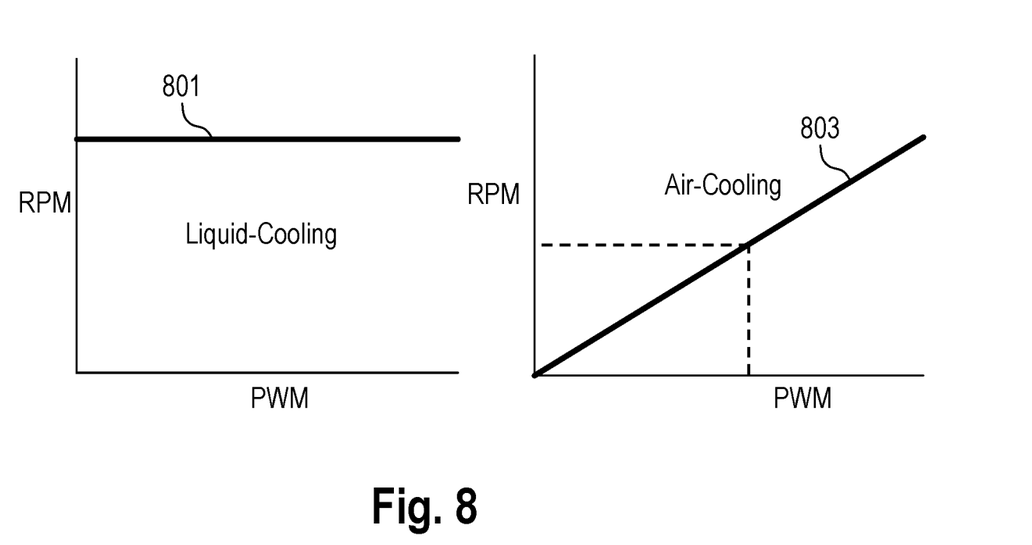
FIG. 8 illustrates the tachometer output versus PWM input for an embodiment of air and liquid cooling systems.

FIG. 8 illustrates RPM versus pulse width of the PWM signal for an embodiment of liquid-cooling and air-cooling systems, where the PWM signal is the control signal for the cooling system. FIG. 8 shows RPM 801 of an embodiment of a liquid cooling system is static regardless of the PWM pulse width. In such a liquid cooling embodiment, the pulse width of the PWM signal does not affect the RPM output associated with the liquid pump. FIG. 8 also shows that for the air cooling curve 803, the pulse width of the PWM signal supplied from the thermal controller has a linear relationship with the fan RPM. In one embodiment of an air cooling system, a PWM signal at 50% results in an RPM that is 50% of full scale. Of course, other linear relationships or even nonlinear relationships can exist in other embodiments.

Figure 9:
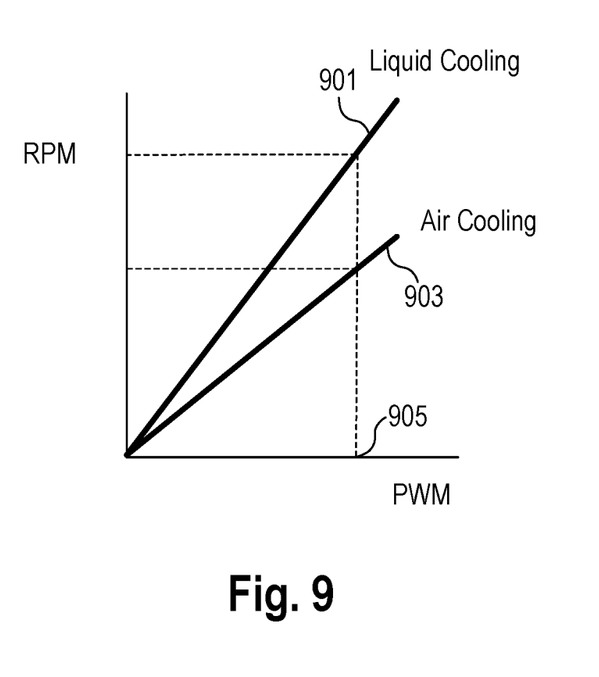
FIG. 9 illustrates the tachometer output versus PWM input for another embodiment of air and liquid cooling systems.

FIG. 9 illustrates another embodiment in which both the liquid cooling system and the air cooling system have linear relationships with the pulse width of the PWM signal. That means that for a liquid cooling system increased liquid flow occurs as the pulse width of the PWM signal increases causing, e.g., the impeller to turn faster. Increased air flow also occurs for an air cooling system as the pulse width of the PWM signal increases causing the fan RPM to increase. However, as seen in FIG. 9 the slope of the liquid cooling curve 901 differs from the slope of the air cooling curve 903. The difference in the curves shown in FIGS. 8 and 9 allows the thermal controller to detect the type of cooling system that is installed. Note that linear relationships different than those shown in FIG. 9 or even nonlinear relationships can exist in other embodiments.

Figure 10:
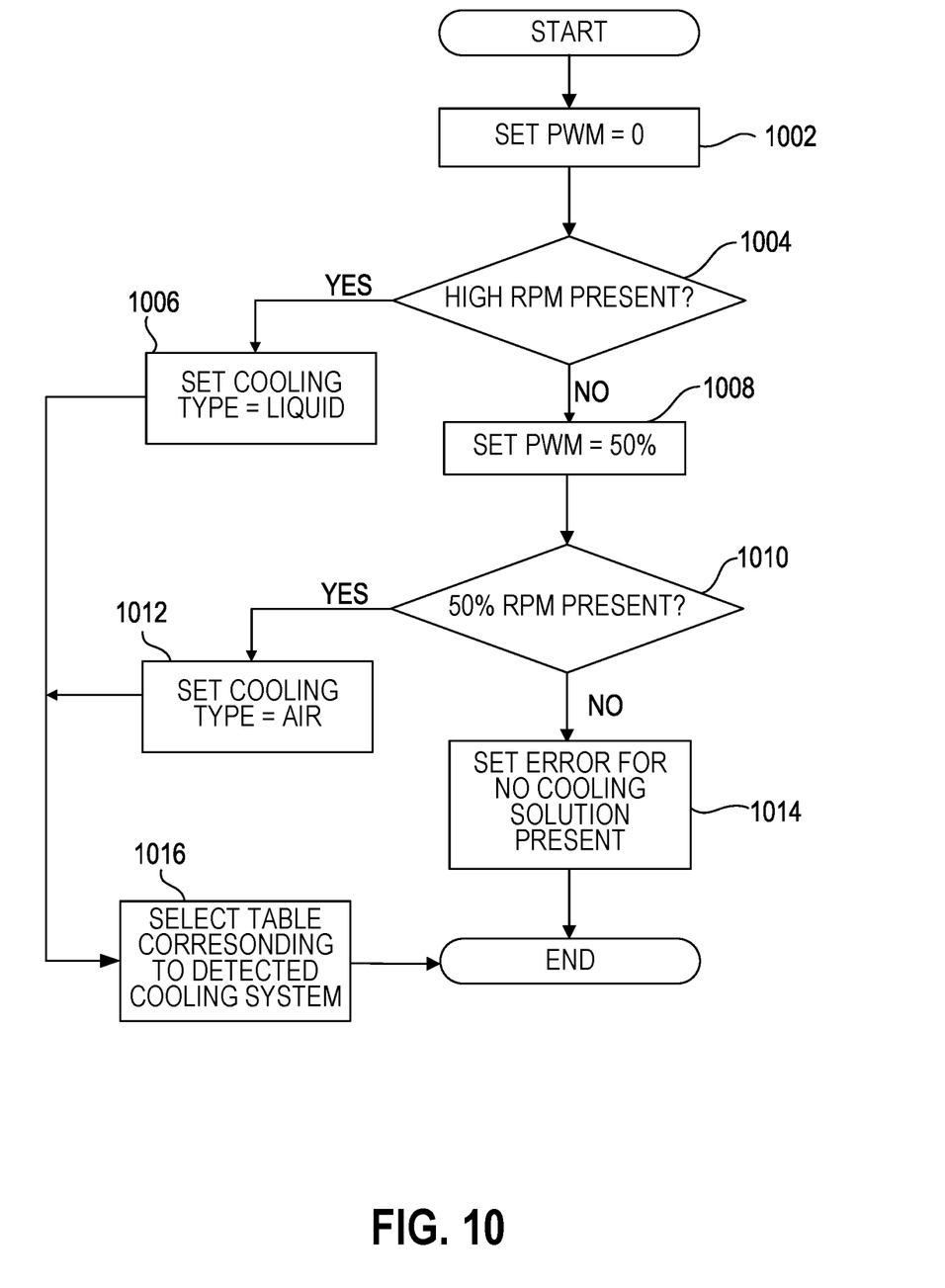
FIG. 10 illustrates a flow chart for one embodiment of detecting the cooling system based on tachometer output.

FIG. 10 illustrates a flow diagram for the control functionality used by the thermal controller to detect the type of cooling system being used in the IHS. In an embodiment, the software/firmware runs at bootup to determine the installed cooling system. The embodiment of FIG. 10 illustrates detection where the two cooling systems have RPM versus PWM curves as illustrated in FIG. 8. The thermal controller sets the PWM signal to a pulse width of 0 in 1002 and supplies that value through the connector to the installed cooling system. To detect the type of cooling system that is installed, the thermal controller checks the RPM value via the tachometer signal in 1004 and if an RPM value is present that corresponds to the RPM of a liquid cooling system shown by curve 801 in FIG. 8 with a zero (or very low PWM pulse width value), the thermal controller sets the cooling type to be liquid in 1006. Note that an air cooling system may operate at a few hundred RPM even with a 0 pulse width of the PWM signal. Thus, in an embodiment a liquid cooling system has a significantly higher RPM (at least an order of magnitude) than an air cooling system at a 0 or a low pulse width PWM signal. To account for worst case tolerance (margin of error) in the RPM measurement, in embodiments the thermal controller checks for a predetermined target RPM value±10% or other appropriate tolerance factor. If the thermal control determines high RPM is not present in 1004, the thermal controller sets the pulse width value of the PWM signal to a valid pulse width value for air cooling in 1008 and checks for an appropriate RPM value. For example, the thermal controller sets the PWM signal to have a 50% pulse width in 1008 and checks the RPM value in 1010 to determine if the RPM corresponds to the 50% PWM signal. For example, in an embodiment the RPM value for a 50% pulse width PWM signal is 50% of full scale. Again, to account for worst case margin in the tachometer value, the thermal controller may check for a predetermined target RPM value±10% or other appropriate tolerance factor. If the appropriate RPM value is present in 1010, the thermal controller sets the cooling type to be air in 1012.

If the thermal controller determines that the appropriate RPM value is not present in 1010, the thermal controller sets the cooling type to not installed (an error condition) in 1014, which results in an error during system boot and throttling of the system to prevent system damage. If a cooling system was found and the cooling type set in 1006 or 1012, the thermal control selects the data set corresponding to the detected cooling system in 1016 for use during thermal management of the system. The data set may be tables indicating the appropriate pulse width values for the PWM control signal for a detected temperature, equations for use in determining appropriate PWM signal pulse width values for detected temperature, or a combination of tables and equations. Thus, the thermal tables selected (liquid or air cooling) for use during system operation are based on the detected cooling system. That ensures that the system throttling/fan control points will operate correctly according to the detected installed cooling system for thermal management during normal operation.

Figure 11:
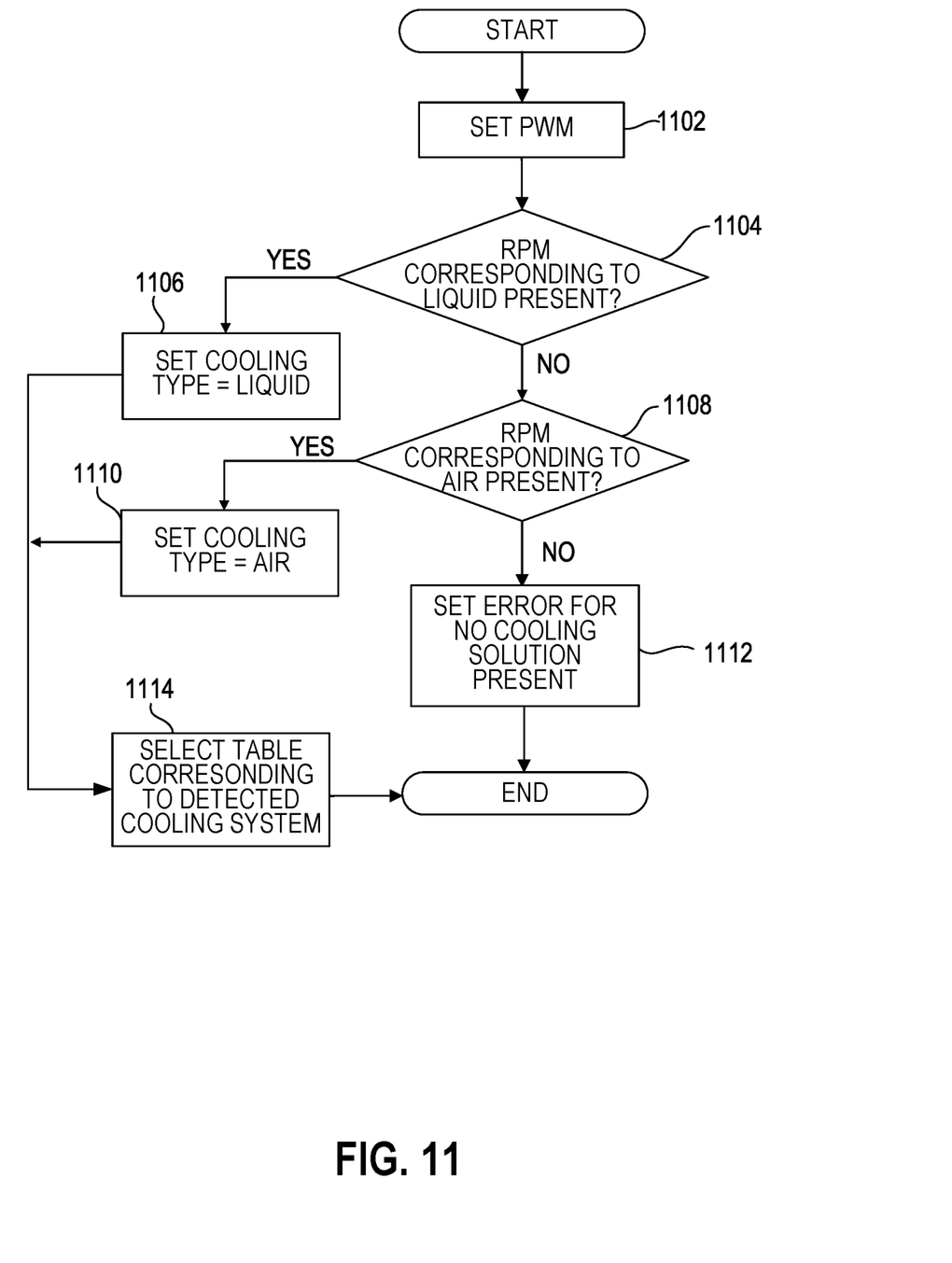
FIG. 11 illustrates a flow chart for another embodiment of detecting the cooling system based on tachometer output.

FIG. 11 illustrates a flow diagram for the control functionality used by the thermal controller to detect the type of cooling system being used in the IHS. In an embodiment, the software/firmware runs at bootup to determine the installed cooling system. The embodiment of FIG. 11 illustrates detection of the cooling systems having RPM versus PWM curves illustrated in FIG. 9. The thermal controller sets the PWM signal to a first pulse width value in 1102 and supplies that value through the connector to the installed cooling system. The value should be selected to ensure there is a sufficient difference between the RPMs of the two cooling systems to account for the worst case tolerance of the RPM values. Referring to FIG. 9 as an example, selecting a pulse width value at 905 provides separation of the two curves as compared to a pulse width value that is closer to 0. In 1104 the thermal controller checks if the RPM corresponds to the liquid cooling system. If so, the thermal controller sets the cooling type to be liquid in 1106. If in 1104 the RPM does not correspond to the liquid cooling system, the thermal controller checks if the RPM corresponds to air cooling in 1108. If so, the thermal controller sets the cooling type to be air in 1110. If the thermal controller determines that the appropriate RPM value is not present in 1108, the thermal controller sets the cooling type to not installed (an error condition) in 1112, which in embodiments results in an error during system boot and throttling of the system to prevent system damage. If a cooling system was found and the cooling type set in 1106 or 1110, the thermal control selects the data set corresponding to the detected cooling system in 1114. Thus, the thermal handling tables will automatically be selected for liquid or air cooling based on the detected cooling system and the system throttling/fan control points will operate correctly during system operation.

Note that the embodiment illustrated in FIG. 11 can also work for the system cooling systems having the RPM versus PWM curves shown in FIG. 8 as long as the PWM value selected ensures there is a sufficient difference between the RPMs of the two cooling systems to account for the worst case tolerance of the RPM values. That allows a single PWM setting to be used to detect the installed cooling system. Note also that while the control signal supplied from the thermal controller to the cooling system has been described as a PWM signal, other control signaling techniques, e.g., voltage, can be used to control air and or water flow.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected directly or indirectly.

Thus, various aspects have been described relating to the use of a single connector for both liquid and air cooling and detection of the type of cooling system installed. The use of a single connector reduces part count. The detection provides the ability to choose the correct thermal handling table based on the cooling system installed and to also detect an error when the cooling system is missing, all within the same single connector definition without an extra detect pin. The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A method for determining a cooling system being used in an information handling system comprising:
    determining the cooling system to be a first type of cooling system responsive to a tachometer signal indicating a first tachometer value indicating a first rotational speed of a first component of the first type of cooling system; and
    determining the cooling system to be a second type of cooling system responsive to the tachometer signal indicating a second tachometer value indicating a second rotational speed of a second component of the second type of cooling system.

2. The method as recited in claim 1 further comprising setting a control signal for the cooling system to a first control value to determine if the cooling system is the first type of cooling system.

3. The method as recited in claim 2 further comprising:
    determining whether the cooling system is the second type of cooling system with the control signal set to the first control value.

4. The method as recited in claim 3 further comprising:
    determining an error condition to exist responsive to the control signal at the first control value not resulting in the tachometer signal indicating the first tachometer value nor resulting in the tachometer signal indicating the second tachometer value, thereby indicating that no cooling system is installed.

5. The method as recited in claim 2 further comprising:
    setting the control signal for the cooling system to a second control value responsive to the control signal at the first control value not resulting in the tachometer signal indicating the first tachometer value; and
    determining the cooling system to be the second type of cooling system responsive to the tachometer signal indicating the second tachometer value while the cooling system is operating with the control signal being at the second control value.

6. The method as recited in claim 5 further comprising determining an error condition to exist responsive to the control signal at the first control value not resulting in the tachometer signal indicating the first tachometer value and the control signal at the second control value not resulting in the tachometer signal indicating the second tachometer value, thereby indicating that no cooling system is installed.

7. The method as recited in claim 5 further comprising receiving the tachometer signal from a tachometer pin of a connector with the control signal set to the first control value and receiving the tachometer signal from the tachometer pin of the connector with the control signal set to the second control value.

8. The method as recited in claim 1 further comprising:
    selecting a first control table corresponding to the first type of cooling system responsive to determining the cooling system to be the first type of cooling system; and
    selecting a second control table corresponding to the second type of cooling system responsive to determining the cooling system to be the second type of cooling system.

9. The method as recited in claim 1 wherein the first type of cooling system is a liquid cooling system and the second type of cooling system is an air cooling system.

10. An information handling system comprising:
    a thermal management controller coupled to receive a tachometer signal and to supply a control signal to a cooling system;
    wherein the thermal management controller determines the cooling system supplying the tachometer signal to be a first type of cooling system responsive to the tachometer signal indicating a first tachometer value corresponding to the first type of cooling system;
    wherein the first tachometer value indicates a first rotational speed of a first component of the first type of cooling system;
    wherein the thermal management controller determines the cooling system to be a second type of cooling system responsive to the tachometer signal indicating a second tachometer value corresponding to the second type of cooling system; and wherein the second tachometer value indicates a second rotational speed of a second component of the second type of cooling system.

11. The information handling system as recited in claim 10 further comprising a connector coupled to receive the control signal from the thermal management controller and supply the control signal to the cooling system and to receive the tachometer signal from the cooling system and to supply the tachometer signal to the thermal management controller.

12. The information handling system as recited in claim 10 wherein the thermal management controller sets the control signal for the cooling system to a first control value to determine if the cooling system is the first type of cooling system.

13. The information handling system as recited in claim 12 wherein the thermal management controller determines if the tachometer signal indicates the cooling system is the second type of cooling system with the cooling system operating with the control signal at the first control value.

14. The information handling system as recited in claim 10 wherein the thermal management controller determines an error condition to exist responsive to not detecting the first type of cooling system nor the second type of cooling system, thereby indicating that no cooling system is installed.

15. The information handling system as recited in claim 12,
wherein the thermal management controller sets the control signal for the cooling system to be a second control value if the control signal at the first control value did not result in the tachometer signal indicating the first tachometer value; and
wherein the thermal management controller determines the cooling system to be the second type of cooling system responsive to the tachometer signal being at the second tachometer value with the control signal being at the second control value.

16. The information handling system as recited in claim 10 further comprising:
a memory storing a first control table corresponding to the first type of cooling system and a second control table corresponding to the second type of cooling system; and wherein the thermal management controller selects the first control table for thermal management responsive to determining the cooling system being the first type of cooling system and selects the second control table responsive to determining the cooling system being the second type of cooling system.

17. The information handling system as recited in claim 10 wherein the first type of cooling system is a liquid cooling system and the second type of cooling system is an air cooling system.

18. The information handling system as recited in claim 10 wherein the control signal is a pulse width modulated (PWM) control signal.

19. An information handling system comprising:
a cooling system;
a thermal management controller coupled to receive a tachometer signal and supply a control signal to control the cooling system;
a connector coupled to receive the control signal from the thermal management controller and supply the control signal to the cooling system and to receive the tachometer signal from the cooling system and to supply the tachometer signal to the thermal management controller;
wherein the thermal management controller determines the cooling system to be a first type of cooling system responsive to a first value of the tachometer signal indicating the first type of cooling system;
wherein the thermal management controller determines the cooling system to be a second type of cooling system responsive to a second value of the tachometer signal indicating the second type of cooling system;
wherein the first value of the tachometer signal indicates revolutions per minute (RPM) of a fan in the first type of cooling system; and
wherein the second value of the tachometer signal indicates a rotational speed of a component of the second type of cooling system.

20. The information handling system as recited in claim 19 wherein the thermal management controller uses first data for thermal management responsive to determining the cooling system is the first type of cooling system and uses second data for thermal management responsive to determining the cooling system is the second type of cooling system.

* * * * *